United States Patent
Rekimoto

(10) Patent No.: US 9,924,485 B2
(45) Date of Patent: *Mar. 20, 2018

(54) COMMUNICATION APPARATUS, COMMUNICATION METHOD, PROGRAM, INFORMATION MANAGEMENT APPARATUS AND COMMUNICATION SYSTEM

(71) Applicant: Sony Corporation, Tokyo (JP)

(72) Inventor: Junichi Rekimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 187 days.

This patent is subject to a terminal disclaimer.

(21) Appl. No.: 14/252,185

(22) Filed: Apr. 14, 2014

(65) Prior Publication Data

US 2014/0301380 A1    Oct. 9, 2014

Related U.S. Application Data

(63) Continuation of application No. 13/724,215, filed on Dec. 21, 2012, now Pat. No. 8,704,637, which is a (Continued)

(30) Foreign Application Priority Data

Dec. 26, 2008 (JP) .................. 2008-334345

(51) Int. Cl.
H04L 12/26 (2006.01)
H04W 60/04 (2009.01)
(Continued)

(52) U.S. Cl.
CPC .......... *H04W 60/04* (2013.01); *G01S 5/0236* (2013.01); *H04W 4/02* (2013.01); *H04W 64/00* (2013.01); *H04W 64/006* (2013.01)

(58) Field of Classification Search
None
See application file for complete search history.

(56) References Cited

U.S. PATENT DOCUMENTS 6,510,318 B1 * 1/2003 Minagawa ............ H04W 68/04
                                                                          455/433
6,529,733 B1    3/2003 Qing-An et al.
(Continued)

FOREIGN PATENT DOCUMENTS

EP         1887820        8/2006
JP     2001-061178        3/2001
(Continued)

OTHER PUBLICATIONS

International Search Report mailed by the Japanese Patent Office dated Jan. 19, 2010, in International Application No. PCT/JP2009/070814.
Office Action mailed by the Japan Patent Office dated Sep. 11, 2012, in Japanese Application No. 2008-334345 (4 pages).
Mar. 22, 2016, Korean Office Action for related KN Application No. 10-2010-7017719.

*Primary Examiner* — Anh-Vu Ly
*Assistant Examiner* — Hector Reyes Ortiz
(74) *Attorney, Agent, or Firm* — Paratus Law Group, PLLC

(57) ABSTRACT

Provided is a communication apparatus 40 including a positioning unit 421 that obtains position information of a local apparatus by measuring a position of the local apparatus based on signals received from satellites via a communication unit 410, a base station detection unit 422 that obtains base station identification information to identify a base station from the signal received from the base station via the communication unit 410, a history information registration unit 430 that registers first history information containing the position information obtained by the posi-
(Continued)

tioning unit 421 with a history information storage unit 440 and also registers second history information containing the base station identification information obtained by the base station detection unit 422 with the history information storage unit 440, and a transmission control unit 450 that transmits the first history information registered with the history information storage unit 440 to an information management apparatus 20 via the communication unit and also transmits the second history information registered with the history information storage unit 440 to the information management apparatus 20 via the communication unit 410.

12 Claims, 11 Drawing Sheets

Related U.S. Application Data continuation of application No. 12/867,380, filed as application No. PCT/JP2009/070814 on Dec. 14, 2009, now Pat. No. 8,339,242.

(51) Int. Cl.
*G01S 5/02* (2010.01)
*H04W 64/00* (2009.01)
*H04W 4/02* (2018.01)

(56) References Cited

U.S. PATENT DOCUMENTS

| | | | |
|---|---|---|---|
| 7,139,252 B2 | 11/2006 | Babu et al. | |
| 2003/0129980 A1* | 7/2003 | Sayeedi | H04W 64/00 455/435.1 |
| 2004/0072582 A1* | 4/2004 | Aljadeff | H04W 64/00 455/456.1 |
| 2004/0121769 A1* | 6/2004 | Aoki | H04W 8/04 455/435.1 |
| 2006/0183485 A1* | 8/2006 | Mizugaki | H04W 64/00 455/456.1 |
| 2007/0281661 A1 | 12/2007 | Del Signore | |
| 2008/0032712 A1 | 2/2008 | Bemmel et al. | |
| 2008/0228654 A1* | 9/2008 | Edge | G01S 19/48 705/71 |

FOREIGN PATENT DOCUMENTS

| | | |
|---|---|---|
| JP | 2004-355565 | 12/2004 |
| JP | 2006-171012 | 6/2005 |
| JP | 2007-060172 | 3/2007 |
| WO | WO 2005-004528 | 1/2005 |

* cited by examiner

FIG.5

| TIME | LONGITUDE | LATITUDE |
|---|---|---|
| t1 | 135.026 | 35.41 |
| t2 | 135.024 | 35.49 |
| t3 | 135.023 | 35.49 |
| t4 | 135.020 | 35.57 |
| t5 | 135.017 | 35.57 |
| ... | ... | ... |

FIG.6

| TIME | BASE STATION ID |
|---|---|
| T1 | K1 |
| T2 | K1 |
| T3 | K2 |
| ... | ... |

FIG.7

| BASE STATION ID | LONGITUDE | LATITUDE |
|---|---|---|
| K1 | 135.024 | 35.49 |
| K1 | 135.023 | 35.49 |
| K2 | 135.017 | 35.57 |
| ... | ... | ... |

FIG.11

| TIME | LONGITUDE | LATITUDE | TRANSPORTATION DEVICE IDENTIFICATION INFORMATION |
|---|---|---|---|
| t1 | 135.026 | 35.41 | TRAINS |
| t2 | 135.024 | 35.49 | TRAINS |
| t3 | 135.023 | 35.49 | WALK |
| t4 | 135.020 | 35.57 | WALK |
| t5 | 135.017 | 35.57 | TRAINS |
| ... | ... | ... | ... |

FIG.12

| TRANSPORTATION DEVICE IDENTIFICATION INFORMATION | THRESHOLD |
|---|---|
| TRAIN | 2 SEC |
| AUTOMOBILE | 3 SEC |
| BICYCLE | 4 SEC |
| WALK | 5 SEC |
| ... | ... |

COMMUNICATION APPARATUS, COMMUNICATION METHOD, PROGRAM, INFORMATION MANAGEMENT APPARATUS AND COMMUNICATION SYSTEM

CROSS-REFERENCE TO RELATED APPLICATIONS

This is a continuation of and claims the benefit of priority to U.S. patent application Ser. No. 13/724,215, filed Dec. 21, 2012 (now allowed), which is a continuation of U.S. patent application Ser. No. 12/867,380, filed Aug. 12, 2010 (now U.S. Pat. No. 8,339,242), which is a national-phase entry of International Patent Application No. PCT/JP2009/070814, filed Dec. 14, 2009, which claims the benefit of priority to Japanese Patent Application No. 2008-334345, filed in the Japan Patent Office on Dec. 26, 2008. The entire contents of these applications are incorporated herein by reference to their entireties.

TECHNICAL FIELD

The present invention relates to a communication apparatus, a communication method, a program, an information management apparatus, and a communication system.

BACKGROUND ART

Nowadays, receiving apparatuses capable of receiving a radio signal transmitted from a satellite are mounted on movable bodies such as vehicles and mobile phones. According to GPS (Global Positioning System) positioning, the position of a movable body on which such a receiving apparatus is mounted can be estimated. Position estimation technology using such a receiving apparatus is an important common fundamental technology in a variety of fields such as navigation, security, and entertainment. However, position estimation technology based on GPS positioning needs a long time to achieve synchronization acquisition during activation and it is difficult to use the technology indoors or underground where a radio signal from a satellite is not receivable.

Patent Document 1 discloses a technology in which PHS (Personal Handyphone System) measures signal strength of a signal transmitted from a base station and estimates the position of the local apparatus based on the measured signal strength. More specifically, the base station of PHS is installed by a communication operator and thus, the installation position thereof is normally known. Therefore, if PHS measures signal strengths of signals transmitted from three base stations or more and estimates the distance between each base station and the local apparatus based on the measured signal strength, the position of the local apparatus can be estimated on the principle of triangulation using the installation position of each base station as a reference.

Also, position estimation technology in which a communication apparatus that performs radio communication with a base station (access point) of wireless LAN (Local Area Network) measures signal strength of a signal transmitted from the base station and an information management apparatus that can communicate with the communication apparatus estimates the position of the communication apparatus based on the signal strength can be considered. For example, the base station of wireless LAN transmits a beacon for signaling the presence of the base station of wireless LAN to surroundings thereof in a constant period (for example, five times/sec). The communication apparatus transmits the signal strength of such a beacon to the information management apparatus and the information management apparatus can estimate the position of the communication apparatus based on the signal strength and the position of the base station of wireless LAN registered in advance. According to the position estimation technology, base stations of wireless LAN are also installed indoors or underground and thus, an indoor or underground position can also be estimated, which is difficult to achieve according to the position estimation technology based on GPS positioning. That is, if base station information indicating the positions of base stations of wireless LAN installed around the communication apparatus is registered with the information management apparatus, the position estimation technology can be considered to be a technology superior in convenience and simplicity.

CITATION LIST

Patent Literature

Patent Document 1: Japanese Patent Application Laid-Open No. 2006-171012

SUMMARY OF INVENTION

Technical Problem

However, base stations of wireless LAN are mostly installed by many and unspecified users. Thus, it is difficult to register base station information of all base stations of wireless LAN with the information management apparatus in advance. Moreover, there is a possibility that a base station of wireless LAN is added or the installation position thereof is changed and thus, it is cumbersome to personally update the base station information of the information management apparatus each time the addition or change occurs.

The present invention has been made in view of the above issues and it is desirable to provide a novel and improved technology capable of automatically reflecting position information indicating the installation position of a base station in base station information.

Solution to Problem

According to the first aspect of the present invention in order to achieve the above-mentioned object, there is provided a communication apparatus, including: a communication unit capable of transmitting and receiving a signal; a history information storage unit; a base station detection unit that obtains base station identification information to identify a base station from the signal received from the base station via the communication unit; a history information registration unit that acquires position information indicating a position of a local apparatus at a predetermined time and first time information indicating the predetermined time and associates the position information and the first time information to register the associated information with the history information storage unit as first history information and also associates the base station identification information obtained by the base station detection unit and second time information indicating the time at which the base station identification information is obtained to register the associated information with the history information storage unit as second history information; and a transmission control unit that transmits the first history information registered with the history information storage unit to another apparatus via the communication unit and also transmits the second history information registered with the history information storage unit to the other apparatus via the communication unit.

The communication apparatus further includes a transportation device identification information acquisition unit that acquires transportation device identification information to identify a transportation device of the local apparatus, and the history information registration unit may associate the transportation device identification information acquired by the transportation device identification information acquisition unit with the first time information contained in the first history information and further includes the associated information in the first history information and registers the first history information with the history information storage unit.

According to the second aspect of the present invention in order to achieve the above-mentioned object, there is provided an information management apparatus, including: a communication unit capable of transmitting and receiving a signal; a storage unit that stores a threshold; a history information registration unit that, when first history information containing position information indicating a position of another apparatus at a predetermined time and first time information indicating the predetermined time being associated is received via the communication unit, registers the first history information with the storage unit and, when second history information containing base station identification information and second time information indicating a time at which the base station identification information is acquired being associated is received via the communication unit, registers the second history information with the storage unit; a registration determination unit that calculates a difference value between the first time information and the second time information to determine whether the difference value is less than the threshold stored in the storage unit; and a base station information registration unit that, when the registration determination unit determines that the difference value is less than the threshold, registers information obtained by the position information contained in the first history information registered with the storage unit and the base station identification information contained in the second history information registered with the storage unit being associated as base station Information with the storage unit.

The storage unit may store the threshold for each piece of transportation device identification information to identify a transportation device of the other apparatus and the registration determination unit may acquire the threshold corresponding to the transportation device identification information from the storage unit when the transportation device identification information is contained in the first history information to determine whether the difference value is less than the threshold.

According to the third aspect of the present invention in order to achieve the above-mentioned object, there is provided a communication system having a communication apparatus and an information management apparatus, wherein the communication apparatus includes: a communication unit capable of transmitting and receiving a signal; a history information storage unit; a base station detection unit that obtains base station identification information to identify a base station from the signal received from the base station via the communication unit; a history information registration unit that acquires position information indicating a position of a local apparatus at a predetermined time and first time information indicating the predetermined time and associates the position information and the first time information to register the associated information with the history information storage unit as first history information and also associates the base station identification information obtained by the base station detection unit and second time information indicating the time at which the base station identification information is obtained to register the associated information with the history information storage unit as second history information; and a transmission control unit that transmits the first history information registered with the history information storage unit to the information management apparatus via the communication unit and also transmits the second history information registered with the history information storage unit to the information storage apparatus via the communication unit and the information management apparatus includes: a communication unit capable of transmitting and receiving a signal; a storage unit that stores a threshold; a history information registration unit that, when first history information containing position information indicating a position of another apparatus at a predetermined time and first time information indicating the predetermined time being associated is received via the communication unit, registers the first history information with the storage unit and, when second history information containing base station identification information and second time information indicating a time at which the base station identification information is acquired being associated is received via the communication unit, registers the second history information with the storage unit; a registration determination unit that calculates a difference value between the first time information and the second time information to determine whether the difference value is less than the threshold stored in the storage unit; and a base station information registration unit that, when the registration determination unit determines that the difference value is less than the threshold, registers information obtained by the position information contained in the first history information registered with the storage unit and the base station identification information contained in the second history information registered with the storage unit being associated as base station information with the storage unit.

Advantageous Effects of Invention

According to the present invention, as described above, position information indicating the installation position of a base station can automatically be reflected in base station information.

BRIEF DESCRIPTION OF DRAWINGS

FIG. 5 is a diagram exemplifying a data structure (Part 1) of position information acquisition history information.

FIG. 6 is a diagram exemplifying the data structure of base station ID acquisition history information.

FIG. 7 is a diagram exemplifying the data structure of base station information.

FIG. 11 is a diagram exemplifying a data structure (Part 2) of position information acquisition history information.

FIG. 12 is a diagram exemplifying the data structure of transportation device information.

REFERENCE SIGNS LIST

Figure 1:
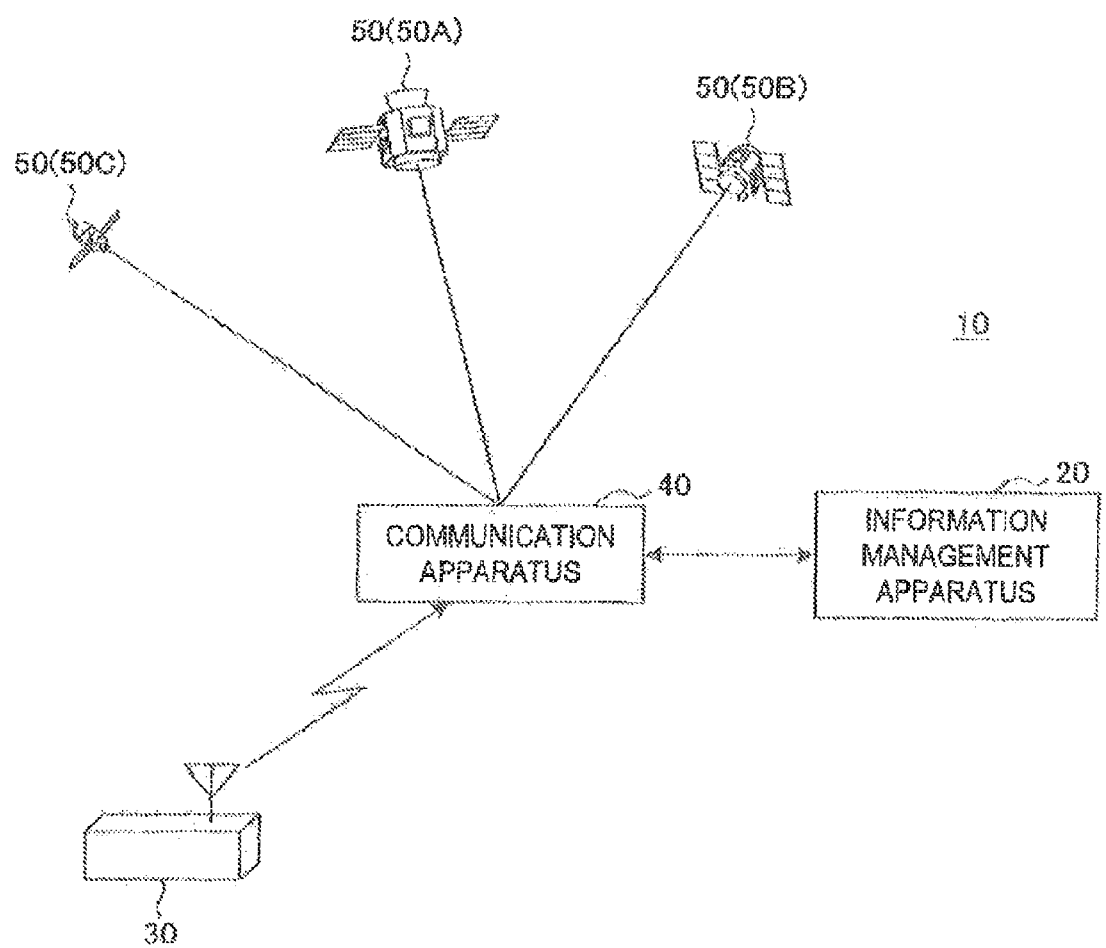
FIG. 1 is an explanatory view showing the configuration of a communication system according to the present embodiment.

10 communication system
20 information management apparatus
30 base station
40 communication apparatus
50 satellite
210 communication unit
220 storage unit
230 registration determination unit
240 base station information registration unit
250 transmission control unit
260 history information registration unit
410 communication unit
421 positioning unit
422 base station detection unit
430 history information registration unit
440 history information storage unit
445 transportation device identification information acquisition unit
450 transmission control unit
460 control unit
470 display unit
480 information update unit
490 base station information storage unit

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

1. System Configuration of Communication System
2. Function Configuration of Communication Apparatus
3. Function Configuration of Information Management Apparatus
4. Description When Time Information Is Included in History Information
5. Data Structure of Position Information Acquisition History Information (Part 1)
6. Data Structure of Base Station ID Acquisition History Information
7. Data Structure of Base Station Information
8. Operation of Communication Apparatus (Part 1)
9. Operation of Information Management Apparatus (Part 1)
10. Operation of Communication System
11. Description When Transportation Device Identification Information Is Included in History Information
12. Data Structure of Position Information Acquisition History Information (Part 2)
13. Data Structure of Transportation Device information
14. Operation of Communication Apparatus (Part 2)
15. Operation of Information Management Apparatus (Part 2)
16. Effects of the Present Embodiment
17. Modification of the Present Embodiment

[1. System Configuration of Communication System]

First, a communication system according to an embodiment of the present invention will be described. In the communication system according to the present embodiment, a communication apparatus and an information management apparatus constituting the communication system have striking features. More specifically, the communication apparatus has a function to acquire position information indicating the position of the local apparatus and to transmit the position information to the information management apparatus and a function to acquire identification information of a detected base station and to transmit the identification information to the information management apparatus. The information management apparatus has a function to associate and register position information and identification information transmitted from the communication apparatus. FIGS. 1 to 14 are used for the description below.

FIG. 1 is an explanatory view showing the configuration of a communication system 10 according to the present embodiment. The communication system 10 includes an information management apparatus 20 and a communication apparatus 40.

A base station 30 relays communication between spatially scattered communication apparatuses. For example, the base station 30 can relay radio communication between the communication apparatus 40 and another communication apparatus (not shown) each within the coverage by radio or communication between the communication apparatus 40 and a communication apparatus connected to the base station 30 by wire. More specifically, the base station 30 may be a base station of wireless LAN (Local Area Network) based on the WiFi (Wireless Fidelity) standard, a base station of GSM (Global System for Mobile Communications), or a base station of Bluetooth.

The base station 30 can transmit, in addition to a signal when radio communication is relayed, a beacon signal for signaling the presence of the base station 30 to surroundings thereof periodically. The beacon signal contains, for example, a base station ID as base station identification information uniquely attached to the base station 30. As a result, the communication apparatus 40 can verify the presence of the base station 30 present in the surroundings based on the base station ID of the received beacon signal.

A satellite 50 contains an atomic clock and transmits a signal containing time information to the surface of the earth. While FIG. 1 shows satellites 50A to 50C as the satellite 50 that transmits a signal receivable by the communication apparatus 40, the number of the satellites 50 is not limited to, if the number thereof is three or greater. If there is no need to distinguish the satellites 50A to 50C, the satellites 50A to 50C will be called the satellites 50.

The communication apparatus 40 can transmit and receive various kinds of data based on radio communication controlled by the base station 30. For example, the communication apparatus 40 can receive content data from a content delivery server (not shown) via the base station 30. The communication apparatus 40 can, for example, also transmit and receive e-mails to/from other communication apparatuses (not shown). As content data, any kind of data including music data such as music, lectures, and radio programs, video data such as movies, TV programs, video programs, photos, paintings, and charts, games, and software can be cited.

The communication apparatus 40 can measure the position of the local apparatus based on signals from the satellites 50. More specifically, the communication apparatus 40 measures the position of the local apparatus by calculating the distance from each of the satellites 50A to 50C based on time information contained in a signal received from each of the satellites 50A to 50C. When the communication apparatus 40 receives a signal from each of the satellites 50A to 50C, the communication apparatus 40 can measure the latitude and the longitude of the local apparatus as the position of the local apparatus. When the communication apparatus 40 receives signals from four satellites 50, in addition to the latitude and the longitude of the local apparatus, the communication apparatus 40 can measure the altitude of the local apparatus.

The communication apparatus 40 described above may be, for example, an information processing apparatus such as a PC (Personal Computer), household video processing apparatus (such as a DVD recorder and VCR), mobile phone, PHS (Personal Handyphone System), portable music reproducing apparatus, portable video processing apparatus, PDA (Personal Digital Assistant), household game machine, portable game machine, and household electrical appliances.

The information management apparatus 20 stores base station information in which position information where the base station 30 is installed and the base station ID are associated in advance and has a function to estimate the position of the communication apparatus 40, for example, on the principle of triangulation based on signal strength information received from the communication apparatus 40 and the base station information. The information management apparatus 20 notifies the communication apparatus 40 of the estimated position so that the communication apparatus 40 can recognize the position of the local apparatus. The information management apparatus 20 can respond to position estimation requests from not only the communication apparatus 40, but also a plurality of other communication apparatuses.

The information management apparatus 20 according to the present embodiment is characterized in that when a base station is newly installed or the position of a base station is changed, content of stored base station information can be updated following installation information of actual base stations. A detailed configuration of the communication apparatus 40 according to the present embodiment will be described below with reference to FIG. 2.

[2. Function Configuration of Communication Apparatus]

Figure 2:
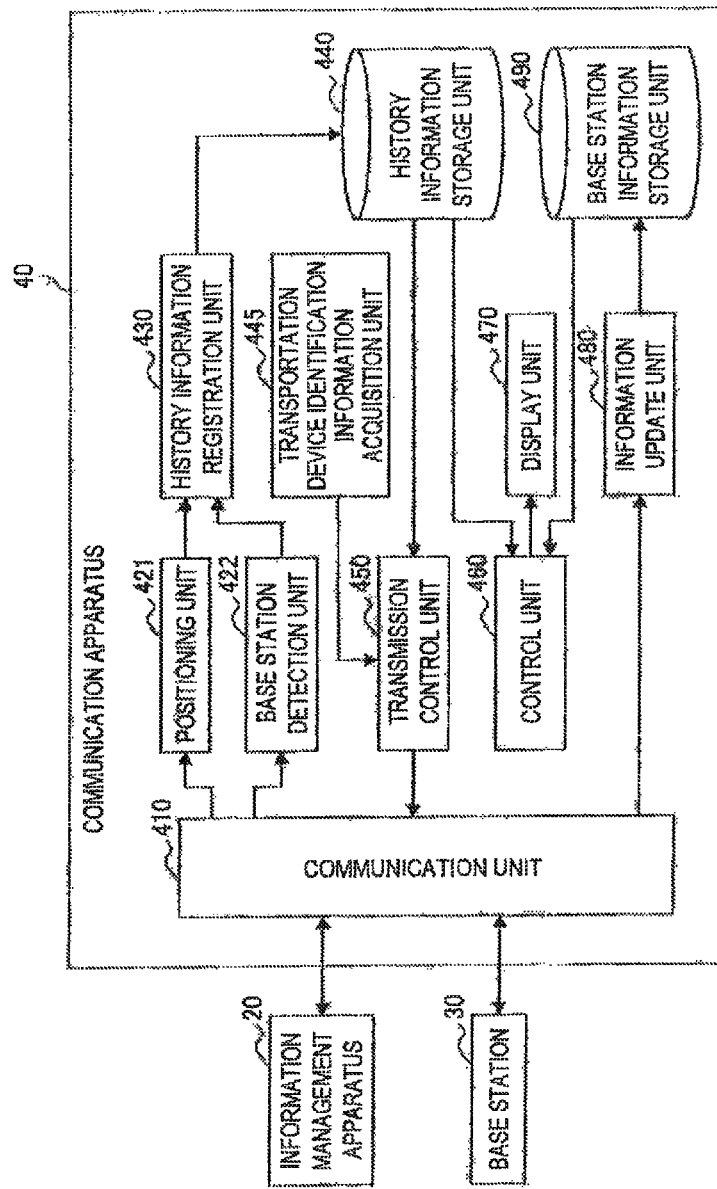
FIG. 2 is a block diagram showing the function configuration of a communication apparatus according to the present embodiment.

FIG. 2 is a block diagram showing the function configuration of the communication apparatus 40 according to the present embodiment. The communication apparatus 40 includes a communication unit 410, a positioning unit 421, a base station detection unit 422, a history information registration unit 430, a history information storage unit 440, and a transmission control unit 450. The communication apparatus 40 may further include a transportation device identification Information acquisition unit 445, a control unit 460, a display unit 470, an information update unit 480, and a base station information storage unit 490. The function held by the transportation device identification information acquisition unit 445 will be described in [11. Description When Transportation Device [Identification Information Is Included in History Information] and thereafter.

The communication unit 410 can transmit and receive a signal. The communication unit 410 has, for example, a function as a receiving unit to receive a signal (for example, a beacon signal) transmitted by the base station 30 in the surroundings and a function as a transmitting unit to transmit history information described later to the information management apparatus 20. The communication unit 410 may be a wireless LAN compatible communication apparatus, GSM compatible communication apparatus, or Bluetooth compatible communication apparatus. The communication unit 410 also has a function as a receiving unit to receive a signal from the satellite 50. The communication unit 410 is constituted by including an antenna capable of receiving signals from the satellites 50.

The positioning unit 421 is constituted by, for example, a CPU (Central Processing Unit), ROM (Read Only Memory), and RAM (Random Access Memory) and acquires position information of the local apparatus by measuring the position of the local apparatus based on signals received from the satellites 50 via the communication unit 410. The acquisition of position information is not limited to this. For example, the communication apparatus 40 may include an input unit (not shown) so that information input by a user from the input unit (not shown) is acquired as position information. In this case, the positioning unit 421 may not be present.

The base station detection unit 422 is constituted by, for example, CPU, ROM, and RAM and acquires the base station ID to identify the base station 30 from a signal received from the base station 30 via the communication unit 410.

The history information registration unit 430 is constituted by, for example, a CPU, ROM, and RAM and registers position information acquisition history information, which is an example of first history information containing position information acquired by the positioning unit 421, with the history information storage unit 440. The history information registration unit 430 also registers base station ID acquisition history information, which is an example of second history information containing base station IDs acquired by the base station detection unit 422, with the history information storage unit 440.

The history information storage unit 440 is constituted by, for example, a magnetic storage device such as an HDD (Hard Disk Drive), semiconductor storage device, optical storage device, or magneto-optical storage device and stores history information. The history information is more concretely position information acquisition history information or base station ID acquisition history information registered by the history information registration unit 430. The configuration of position information acquisition history information and base station ID acquisition history information stored in the history information storage unit 440 will be described later with reference to FIGS. 5 and 6 respectively.

The transmission control unit 450 transmits position information acquisition history information registered with the history information storage unit 440 to the information management apparatus 20, which is an example of another apparatus, via the communication unit 410. The transmission control unit 450 also transmits base station ID acquisition history information registered with the history information storage unit to the information management apparatus 20 via the communication unit 410. The timing for the transmission control unit 450 to transmit position information acquisition history information or base station ID acquisition history information to the information management apparatus 20 is not specifically limited and may be when a fixed amount of history information is stored, when a fixed time elapses after the last transmission of history information, or when requested by the information management apparatus 20. The timing may also be when connection to the information management apparatus 20 is started.

The control unit 460 is constituted by, for example, a CPU, ROM, and RAM and acquires the latest history information stored in the history information storage unit 440 to cause the display unit 470 to display the position as the current position of the communication apparatus 40. If, for example, the latest history information stored in the history information storage unit 440 is position information acquisition history information, the control unit 460 causes the display unit 470 to display position information of the local apparatus contained in the position information acquisition history information as the current position of the communication apparatus 40. If, for example, the latest history information stored in the history information storage unit 440 is base station ID acquisition history information, the control unit 460 acquires position information corresponding to the base station ID contained in the base station ID acquisition history information from base station information registered with the base station information storage unit 490 and causes the display unit 470 to display the position information of the local apparatus contained in the position information acquisition history information as the current position of the communication apparatus 40.

If the communication apparatus 40 stores position/address correspondence information in which position information and address information are associated, the control unit 460 may acquire address information corresponding to the position information from the position/address correspondence information to cause the display unit 470 to display the acquired address information.

The display unit 470 is constituted by an apparatus capable of visually notifying the user of acquired information such as a CRT (Cathode Ray Tube) display apparatus, liquid crystal display apparatus, plasma display apparatus, EL (ElectroLuminescence) display apparatus, and display apparatus such as a lamp. The display unit 470 is shown only an example of an output apparatus and the output apparatus may be a sound output apparatus such as a speaker or headphone.

The information update unit 480 is constituted by, for example, a CPU, ROM, and RAM and updates base station information registered with the base station information storage unit 490 with the base station information received from the information management apparatus 20 via the communication unit 410. If, for example, the information management apparatus 20 transmits all base station information currently registered with a storage unit 220 to the communication apparatus 40, the communication apparatus 40 receives all the base station information. In this case, the information update unit 480 extracts a difference between base station information registered with the base station information storage unit 490 and the received base station information so that the extracted content can be reflected in the base station information storage unit 490. When the communication apparatus 40 receives all the base station information currently registered with the storage unit 220 from the information management apparatus 20, the information update unit 480 may delete all data in the base station information storage unit 490 to newly register all the base station information currently registered with the storage unit 220.

By providing a database to store base station information on the side of the communication apparatus 40 in this manner, the communication apparatus 40 can estimate the position of the local apparatus without accessing the information management apparatus 20. Since the registration status of actual base stations changes every moment, it is necessary to cause base station information registered with the base station information storage unit 490 of the communication apparatus 40 to change following the registration status. Thus, as described later, the registration status of actual base stations changing every moment is dealt with by base station information being transmitted to the communication apparatus 40 by the information management apparatus 20 in predetermined timing.

The base station information storage unit 490 is constituted by, for example, a magnetic storage device such as an HDD, semiconductor storage device, optical storage device, or magneto-optical storage device and stores base station information in which the base station ID of a base station and position information indicating the installation position of the base station are associated. The configuration of the base station information stored in the base station information storage unit 490 will be described later with reference to FIG. 7.

The function of the communication unit 410 described above can be realized by a program controlling the communication apparatus being executed by a CPU. Based on computer programs to cause a computer to perform the functions held by the positioning unit 421, the base station detection unit 422, the history information registration unit 430, the transmission control unit 450, the control unit 460, and the information update unit 480, hardware resources such as a CPU, ROM, and RAM can be caused to exercise the function equivalent to each of the above units.

[3. Function Configuration of Information Management Apparatus]

Figure 3:
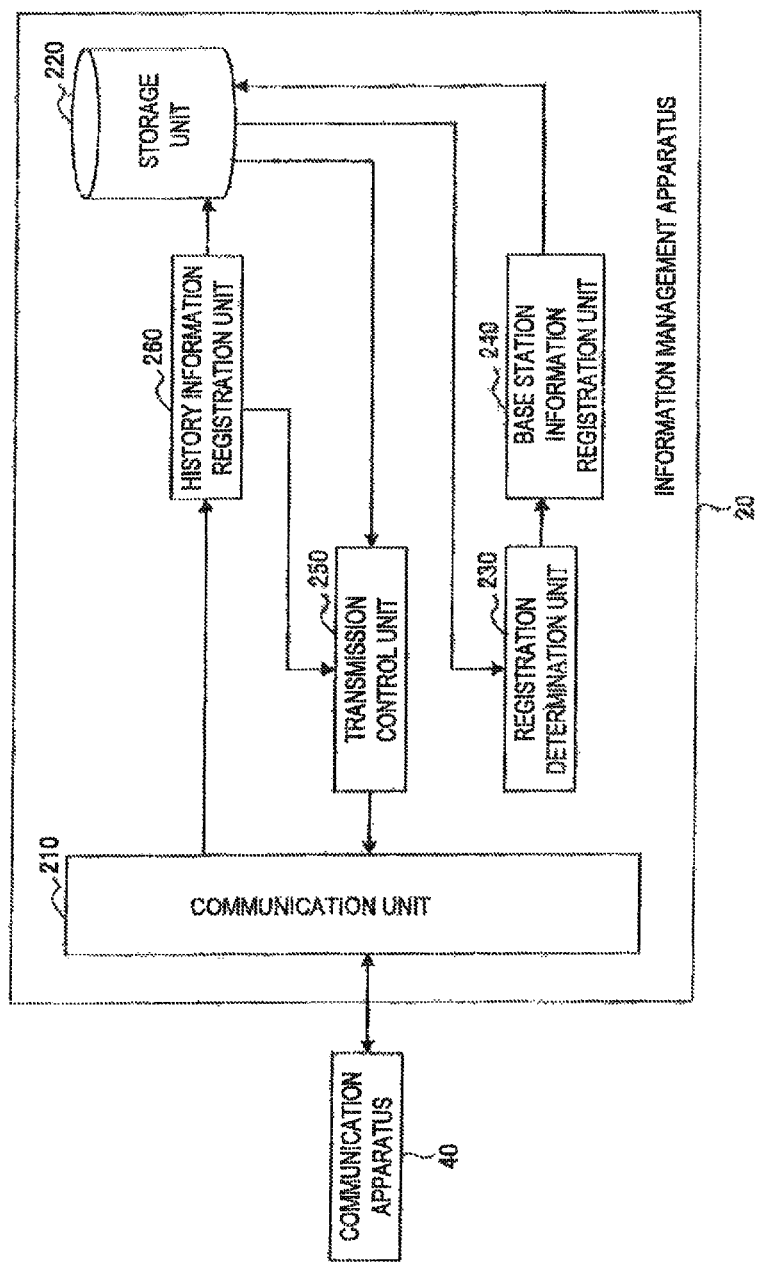
FIG. 3 is a block diagram showing the function configuration of an information management apparatus according to the present embodiment.

FIG. 3 is a block diagram showing the function configuration of the information management apparatus 20 according to the present embodiment. The information management apparatus 20 includes a communication unit 210, the storage unit 220, a base station information registration unit 240, and a history information registration unit 260. The information management apparatus 20 may further include a registration determination unit 230 and a transmission control unit 250. The registration determination unit 230 will be described later with reference to FIG. 4.

The communication unit 210 can transmit and receive a signal and functions, for example, as an interface to transmit and receive information to/from the communication apparatus 40. The communication unit 210 may be a wireless LAN compatible communication apparatus, wireless USB compatible communication apparatus, or wire communication apparatus that performs communication by wire. Moreover, the communication unit 210 can transmit and receive information to/from not only one communication apparatus, but also many and unspecified communication apparatuses, which is equal to or greater than two communication apparatuses.

The storage unit 220 is constituted by, for example, a magnetic storage device such as an HDD, semiconductor storage device, optical storage device, or magneto-optical storage device and stores information obtained by associating the base station ID of a base station that performs radio communication with the communication apparatus 40 with position information indicating the installation position of the base station as base station information. An example of the base station information stored in the storage unit 220 will be described later with reference to FIG. 7. The storage unit 220 stores position information acquisition history information, base station ID acquisition history information and the like and the configuration of the position information acquisition history information and base station ID acquisition history information will be described later with reference to FIGS. 5 and 6 respectively.

The history information registration unit 260 is constituted by, for example, a CPU, ROM, and RAM and, when position information acquisition history information containing position information of the communication apparatus 40 is received via the communication unit 210, registers the received position information acquisition history information with the storage unit 220. Also when base station ID acquisition history information containing the base station ID is received via the communication unit 210, the history information registration unit 260 registers the received base station ID acquisition history information with the storage unit 220.

The base station information registration unit 240 is constituted by, for example, a CPU, ROM, and RAM and registers base station information in which position information contained in the position information acquisition history information registered with the storage unit 220 and the base station ID contained in the base station ID acquisition history information registered with the storage unit 220 are associated with the storage unit 220. The timing for the base station information registration unit 240 to register base station information with the storage unit 220 is not specifically limited. The base station information registration unit 240 may register, for example, each time the base station information registration unit 240 updates base station information in the storage unit 220 or at predetermined intervals.

The transmission control unit 250 transmits base station information registered with the storage unit 220 to the communication apparatus 40 via the communication unit 210. The information management apparatus 20 may transmit all base station information currently registered with the storage unit 220 to the communication apparatus 40 or only a difference from base station information registered with the base station information storage unit 490 of the communication apparatus 40. The timing for the transmission control unit 250 to transmit base station information is not specifically limited. For example, the transmission control unit 250 may transmit base station information each time the base station information registration unit 240 updates base station information in the storage unit 220 or at predetermined intervals. Or, the transmission control unit 250 may transmit base station information each time the information management apparatus 20 starts connection to the communication apparatus 40.

The function of the communication unit 210 described above can be realized by a program controlling the communication apparatus being executed by a CPU. Based on computer programs to cause a computer to perform the functions held by the registration determination unit 230, the base station information registration unit 240, the transmission control unit 250, and the history information registration unit 260, hardware resources such as a CPU, ROM, and RAM can be caused to exercise the function equivalent to each of the above units.

Thus, according to the information management apparatus 20 in the present embodiment, base station information can be registered with the storage unit 220 based on history information transmitted from the communication apparatus 40. Therefore, position information indicating the installation position of a base station can automatically be reflected in the base station information.

[4. Description when Time Information is Included in History Information]

Figure 4:
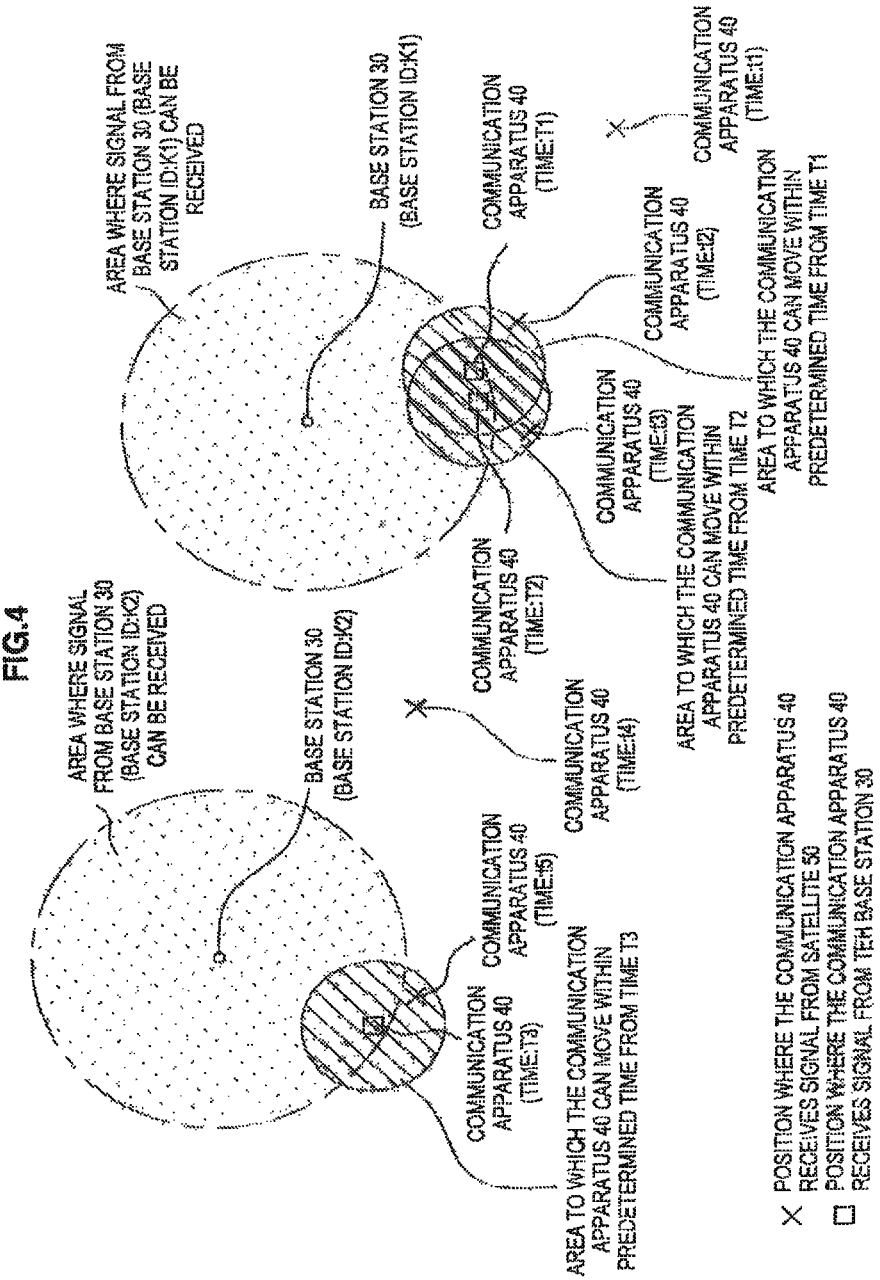
FIG. 4 is a diagram illustrating a case in which time information is included in history information.

FIG. 4 is a diagram illustrating a case in which time information is included in history information. As described above, the base station information registration unit 240 registers base station information in which position information contained in position information acquisition history information registered with the storage unit 220 and the base station ID contained in base station ID acquisition history information registered with the storage unit 220 are associated with the storage unit 220. However, the base station information registration unit 240 may associate position information contained in position information acquisition history information registered with the storage unit 220 and the base station ID contained in base station ID acquisition history information registered with the storage unit 220 and register the associated information with the storage unit 220 when needed. For example, it is assumed that with an increasing time difference between the time when a base station ID is acquired and the time when position information is acquired, an error between the position where the base station ID is acquired and the position where the position information is acquired increases. Thus, position information to be associated with a base station ID is preferably position information acquired at a time having a small time difference from the time when the base station ID is acquired.

FIG. 4 shows how the communication apparatus 40 moves about while acquiring position information (the latitude and longitude) at each time shown in FIG. 5 as an example and a base station ID at each time shown in FIG. 6 as an example. FIG. 4 indicates that an area where a signal from the base station 30 can be received is shown with an area inside a circle drawn by an alternate long and short dash line, but is not limited to. Assume, for example, as shown in FIG. 4, that the communication apparatus 40 moves into an area where a signal from the base station 30 (base station ID "K1") at time T1. In this case, the communication apparatus 40 preferably acquires the base station ID "K1" from the base station 30 at time T1 to associate position information acquired within an area movable within a predetermined time from time T1 with the base station ID "K1".

In FIG. 4, under the assumption that a user carrying the communication apparatus 40 moves at a constant speed, an area movable within a predetermined time from the time at which the base station ID is an area inside a circle drawn with a solid line, but such an area is not limited to this. In the example shown in FIG. 4, the time at which position information is acquired within the predetermined time from time T1 at which the base station ID "K1" is acquired is t2 and t1, t3, t4, and t5 do not correspond to a time at which position information is acquired within the predetermined time. Thus, the information management apparatus 20 may register base station information in which the base station ID acquired at time T1 and the position information acquired at time t2 are associated with the storage unit 220.

Similarly, in the example shown in FIG. 4, the time at which position information is acquired within a predetermined time from time T2 at which the base station ID "K1" is acquired is t3 and t1, t2, t4, and t5 do not correspond to a time at which position information is acquired within the predetermined time. Thus, the information management apparatus 20 may register base station information in which the base station ID acquired at time T2 and the position information acquired at time t3 are associated with the storage unit 220. Also, the time at which position information is acquired within a predetermined time from time T3 at which a base station ID "K2" is acquired is t5 and t1 to t4 do not correspond to a time at which position information is acquired within the predetermined time. Thus, the information management apparatus 20 may register base station information in which the base station ID acquired at time T3 and the position information acquired at time t5 are associated with the storage unit 220.

If the information management apparatus 20 registers base station information with the storage unit 220 according to a procedure like one shown in the above example, base station information as shown in FIG. 7 will be registered with the storage unit 220.

The information management apparatus 20 can impose limitations, as shown above, on base station information to be registered with the storage unit 220. Thus, the history information registration unit 430 of the communication apparatus 40 associates time information (first time information) indicating a time at which position information contained in position information acquisition history information is acquired with the position information and further includes the associated position information in the position information acquisition history information before registering the position information acquisition history information with the history information storage unit 440. The history information registration unit 430 of the communication apparatus 40 also associates time information (second time information) indicating a time at which a base station ID contained in base station ID acquisition history information is acquired with the base station ID and further includes the associated base station ID in the base station ID acquisition history information before registering the base station ID acquisition history information with the history information storage unit 440.

Then, the storage unit 220 of the information management apparatus 20 stores a threshold. The size of the threshold is not specifically limited and may be set freely in accordance with the movement speed of the communication apparatus 40 or the like. For example, the time such as 5 min. and 10 min. can be set as the threshold.

If position information acquisition history information stored in the history information storage unit 440 contains time information indicating a time at which position information is acquired by being associated with the position information and base station ID acquisition history information contains time information indicating a time at which a base station ID is acquired by being associated with the base station ID, the registration determination unit 230 calculates a difference value between the time information indicating the time at which the position information is acquired and the time information indicating the time at which the base station ID is acquired. The registration determination unit 230 determines whether the calculated difference value is less than the threshold stored in the storage unit 220.

If the registration determination unit 230 determines that the difference value is less than the threshold, the base station information registration unit 240 registers the base station information with the storage unit 220.

According to the configuration described above, the information management apparatus 20 can associate a base station ID with position information acquired at a time having a small time difference from a time at which the base station ID is acquired. Thus, an error between the position where the base station ID is acquired and the position where the position information is acquired can be made small.

[5. Data Structure of Position Information Acquisition History Information (Part 1)]

FIG. 5 is a diagram exemplifying a data structure (Part 1) of position information acquisition history information. As shown in FIG. 5, the position information acquisition history information is configured by position information of the communication apparatus 40 at a plurality of time points being associated with time information indicating a time at which the position information of the communication apparatus 40 is obtained. More specifically, in the example shown in FIG. 5, the position information acquisition history information is configured by times t1, t2, t3, t4, and t5 with position information obtained at each piece of time information being associated. Position information acquisition history information need not necessarily contain time information.

[6. Data Structure of Base Station ID Acquisition History Information]

FIG. 6 is a diagram exemplifying the data structure of base station ID acquisition history information. As shown in FIG. 6, the base station ID acquisition history information is configured by a base station ID acquired by the communication apparatus 40 at a plurality of time points being associated with time information indicating a time at which the base station ID is obtained. More specifically, in the example shown in FIG. 6, the base station ID acquisition history information is configured times T1, T2, and T3 with the base station ID obtained at each piece of time information being associated. Base station ID acquisition history information need not necessarily contain time information.

[7. Data Structure of Base Station Information]

FIG. 7 is a diagram exemplifying the data structure of base station information. As shown in FIG. 7, the base station information is configured by a base station ID being associated with the latitude and longitude as an example of position information where a base station is installed. More specifically, the base station ID "K1" is configured by being associated with the longitude (cast longitude) "135.024" and the latitude (north latitude) "35.49". Similarly, the base station ID "K1" is configured by being associated with the longitude "135.023" and the latitude "35.49" and the base station ID "K2" by being associated with the longitude "135.017" and the latitude "35.57". The format of position information is not limited to a format using the latitude and longitude and may be, for example, a format using x and y coordinates, a format using polar coordinates, or a format using vectors.

[8. Operation of Communication Apparatus (Part 1)]

Figure 8:
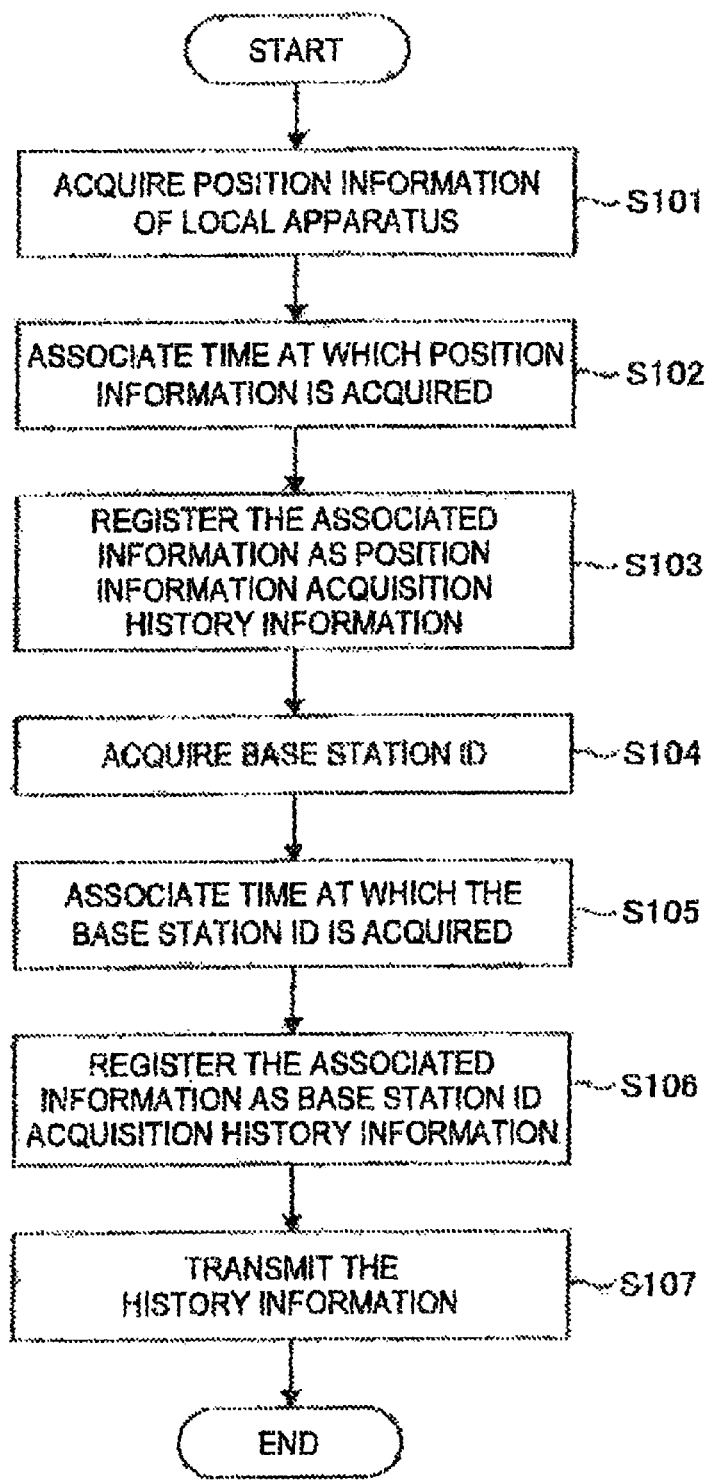
FIG. 8 is a flow chart (Part 1) showing the flow of transmission operation of the history information by the communication apparatus.

Subsequently, a transmission operation (Part 1) of history information by the communication apparatus 40 will be described with reference to FIG. 8. FIG. 8 is a flow chart (Part 1) showing the flow of transmission operation of history information by the communication apparatus 40. A case in which time information is included in history information by the communication apparatus 40 is shown in FIG. 8 and if time information is not included in history information by the communication apparatus 40, there is no need to perform processing in step S103 and step S105.

Referring to FIG. 8, the positioning unit 421 of the communication apparatus 40 first acquires position information of the local apparatus (step S101). The history information registration unit 430 associates the time at which the position information is acquired by the positioning unit 421 with the position information (step S102) and registers the associated information as position information acquisition history information with the history information registration unit 430 (step S103).

Subsequently, the base station detection unit 422 acquires a base station ID (step S104). The history information registration unit 430 associates the time at which the base station ID is acquired by the base station detection unit 422 with the base station ID (step S105) and registers the associated information as base station ID acquisition history information with the history information registration unit 430 (step S106). The transmission control unit 450 transmits history, information containing the position information acquisition history information and base station ID acquisition history information to the information management apparatus 20 in predetermined timing (step S107) and terminates processing. The predetermined timing is as described above.

In the example shown in FIG. 8, one piece each of position information history information and base station ID acquisition history information is assumed to be included in history information for transmission for the sake of simplicity, but the present embodiment is not limited to this and a plurality of pieces of one or both of the position information history information and the base station ID acquisition history information may be included in the history information. The communication apparatus 40 is assumed to transmit position information history information and base station ID acquisition history information simultaneously by including the information in history information, but the position information history information and the base station ID acquisition history information may be transmitted separately. The communication apparatus 40 is also assumed to acquire base station ID acquisition history information after acquiring position information history information, but the order of acquisition is not specifically limited and the position information history information may be acquired after the base station ID acquisition history information being acquired. In addition, processing is to be terminated after step S107, but processing may return to step S101.

[9. Operation of Information Management Apparatus (Part 1)]

Figure 9:
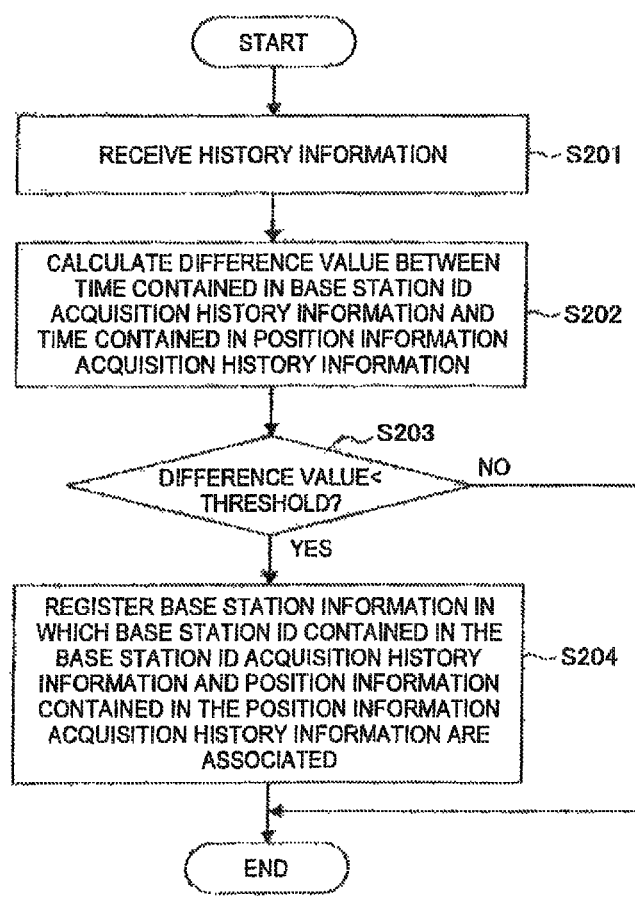
FIG. 9 is a flow chart (Part 1) showing the flow of update operation of the base station information by the information management apparatus.

Subsequently, an update operation (Part 1) of base station information by the information management apparatus 20 will be described with reference to FIG. 9. FIG. 9 is a flow chart (Part 1) showing the flow of update operation of base station information by the information management apparatus 20. FIG. 9 shows a case in which time information is included in history information by the communication apparatus 40 and if time information is not included in history information, there is no need to perform processing in step S202 and step S203.

Referring to FIG. 9, the history information registration unit 260 first receives history information including position information history information and base station ID acquisition history information from the communication apparatus 40 via the communication unit 210 (step S201). The history information registration unit 260 stores the received history information in the storage unit 220. The registration determination unit 230 calculates a difference value between the time contained in the position information history information and the time contained in the base station ID acquisition history information stored in the storage unit 220 (step S202). The registration determination unit 230 determines whether the calculated difference value is less than the threshold stored in the storage unit 220. If the registration determination unit 230 determines that the difference value is not less than the threshold ("NO" in step S203), the registration determination unit 230 terminates processing. If the registration determination unit 230 determines that the difference value is less than the threshold ("YES" in step S203), the registration determination unit 230 registers base station information in which the base station ID contained in the base station ID acquisition history information and position information contained in the position information acquisition history information are associated with the storage unit 220 (step S204) and terminates processing.

In the example shown in FIG. 9, one piece each of position information history information and base station ID acquisition history information is assumed to be included in history information for the sake of simplicity, but the present embodiment is not limited to this and a plurality of pieces of one or both of the position information history information and the base station ID acquisition history information may be included in the history information. In this case, for example, processing similar to processing performed for each piece may be performed for all combinations of the position information history information and the base station ID acquisition history information. Position information history information and base station ID acquisition history information contained in history information are assumed to be received simultaneously, but the position information history information and the base station ID acquisition history information may be received separately. In addition, processing is to be terminated after step S204, but processing may return to step S201.

[10. Operation of Communication System]

Figure 10:
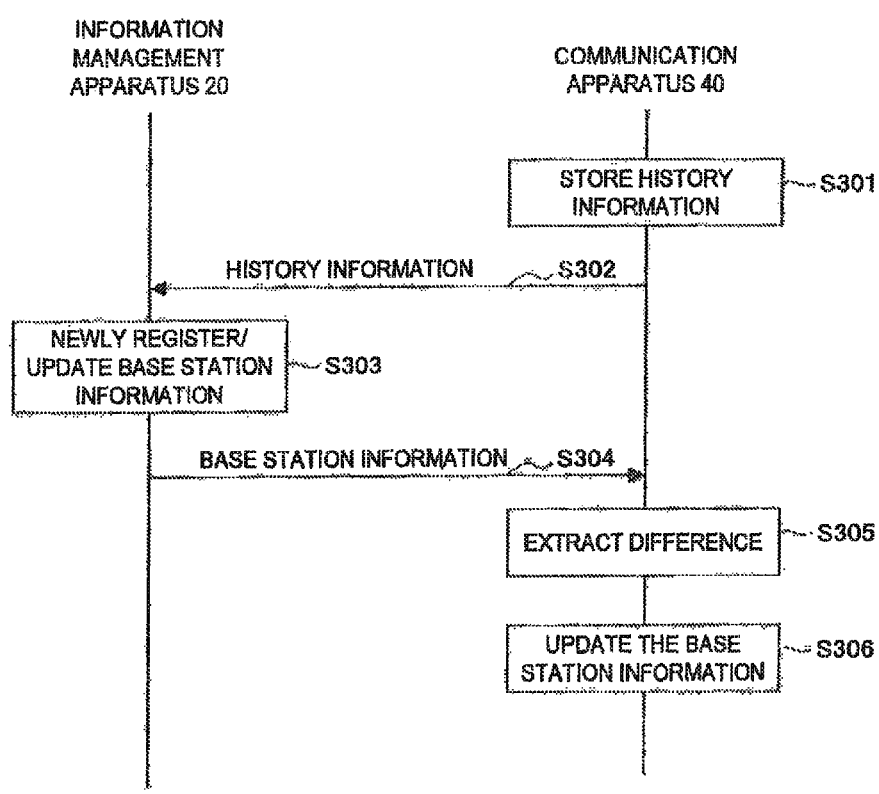
FIG. 10 is a sequence diagram showing the flow of update operation of the base station information by the communication system according to the present embodiment.

Next, an update operation of base station information by the communication system 10 according to the present embodiment will be described with reference to FIG. 10. FIG. 10 is a sequence diagram showing the flow of update operation of base station information by the communication system 10 according to the present embodiment.

As shown in FIG. 10, when history information is stored in the history information storage unit 440 of the communication apparatus 40 (S301), the communication apparatus 40 transmits the history information to the information management apparatus 20 in predetermined timing (S302). A case when a fixed amount of history information is stored, when a fixed time elapses after the last transmission of history information, or when requested by the information management apparatus 20 can be assumed as the predetermined timing.

Next, the information management apparatus 20 newly registers base station information with the storage unit 220 or updates base station information registered with the storage unit 220 based on the received history information (S303). Then, the information management apparatus 20 transmits the changed base station information to the communication apparatus 40 (S304). Subsequently, the information update unit 480 of the communication apparatus 40 extracts a difference between the received base station information and base station information registered with the base station information storage unit 490 (S305). Subsequently, the information update unit 480 updates or changes the base station information registered with the base station information storage unit 490 based on the extracted difference (S306).

[11. Description when Transportation Device Identification Information is Included in History Information]

In the examples described above, a user carrying the communication apparatus 40 is assumed to move at a constant speed. Thus, it is enough for the storage unit 220 of the information management apparatus 20 to store a threshold that is not dependent on the movement speed of the user. However, the movement speed of the user normally changes every moment and it is preferable to change the threshold stored in the storage unit 220 of the information management apparatus 20 in accordance with the user speed to register base station information with the storage unit 220 by reflecting changes in user speed.

More specifically, if the movement speed of the user is relatively fast, an error between the position indicated by position information acquired by the communication apparatus 40 and the position where the base station ID is acquired is considered likely to be relatively great. Thus, if the movement speed of the user is relatively fast, it is preferable to make the threshold stored in the storage unit 220 of the information management apparatus 20 relatively small. Accordingly, the information management apparatus 20 can associate a base station ID and position information and register the associated information with the storage unit 220 as base station information only if a difference value between the time at which the communication apparatus 40 acquires the base station ID and the time at which the communication apparatus 40 acquires the position information is relatively small.

On the other hand, if the movement speed of the user is relatively slow, an error between the position indicated by position information acquired by the communication apparatus 40 and the position where the base station ID is acquired is considered likely to be relatively small. Thus, if the movement speed of the user is relatively slow, it is preferable to make the threshold stored in the storage unit 220 of the information management apparatus 20 relatively large. Accordingly, the information management apparatus 20 can associate a base station ID and position information and register the associated information with the storage unit 220 as base station information even if a difference value between the time at which the communication apparatus 40 acquires the base station ID and the time at which the communication apparatus 40 acquires the position information is relatively large.

To add the functions described above to the communication system 10, transportation device identification information of the user may be included in history information transmitted from the communication apparatus 40 to the information management apparatus 20.

The communication apparatus 40 may further include a transportation device identification information acquisition unit 445 that acquires transportation device identification information to identify a transportation device of the local apparatus. In addition, the history information registration unit 430 may associate the transportation device identification information acquired by the transportation device identification information acquisition unit 445 with first time information contained in first history information and further include the associated first time information in the first history information before registering the first history information with the history information storage unit 440.

The acquisition of transportation device identification information by the transportation device identification information acquisition unit 445 is not specifically limited. The transportation device identification information acquisition unit 445 is constituted by, for example, an input apparatus and may accept input of transportation device identification information from the user.

The transportation device identification information acquisition unit 445 may also acquire transportation device identification information by estimating the transportation device based on first history information stored in the history information storage unit 440. The estimation of the transportation device is not specifically limited.

If, for example, the history information storage unit 440 stores two pieces of first history information, the transportation device identification information acquisition unit 445 calculates a difference value of position information and a difference value of time information regarding the two pieces of first history information. Then, the transportation device identification information acquisition unit 445 may calculate the movement speed by dividing the calculated difference value of position information by the calculated difference value of time information to acquire transportation device identification information in accordance with the movement speed. The acquisition of transportation device identification information in accordance with the movement speed is realized by, for example, association information in which the movement speed and transportation device identification information are associated being stored in the storage unit (not shown) of the communication apparatus 40 and the transportation device identification information associated with the movement speed being acquired by the transportation device identification information acquisition unit 445 from the association information.

The storage unit 220 of the information management apparatus 20 may store the threshold for each piece of transportation device identification information to identify the transportation device of the communication apparatus 40 so that if transportation device identification information is contained in first history information, the registration determination unit 230 of the information management apparatus 20 acquires the threshold corresponding to the transportation device identification information from the storage unit 220 to determine whether the difference value is less than the threshold. Information in which transportation device identification information to identify the transportation device of the communication apparatus 40 and the threshold are associated is stored, for example, in the storage unit 220.

[12. Data Structure of Position Information Acquisition History Information (Part 2)]

FIG. 11 is a diagram exemplifying the data structure (Part 2) of the position information acquisition history information. As shown in FIG. 11, the position information acquisition history information is configured by not only position information of the communication apparatus 40 at a plurality of time points, but also transportation device identification information of the communication apparatus 40 being associated with time information indicating a time at which the position information of the communication apparatus 40 is obtained. More specifically, in the example shown in FIG. 11, the position information acquisition history information is configured by times t1, t2, t3, t4, and t5, position information obtained at each piece of time information, and transportation device identification information (Train, Train, Walk, Walk, and Train) at each piece of time information being associated. Position information acquisition history information need not necessarily contain transportation device identification information. Train and Walk shown as examples of the transportation device identification information are only examples of the transportation device identification information and the transportation device identification information are not limited to these.

[13. Data Structure of Transportation Device Information]

FIG. 12 is a diagram exemplifying the data structure of transportation device information. As shown in FIG. 12, the transportation information is configured by transportation device identification information to identify the transportation device of the communication apparatus 40 and the threshold being associated. More specifically, in the example shown in FIG. 12, the transportation information is configured by transportation device identification information (Train, Automobile, Bicycle, and Walk) and the threshold (2 sec, 3 sec, 4 sec and 5 sec) for the transportation device identified by the transportation device identification information being associated. The transportation information need not necessarily be present. The times shown as thresholds are only examples of thresholds and thresholds are not limited to these.

[14. Operation of Communication Apparatus (Part 2)]

Figure 13:
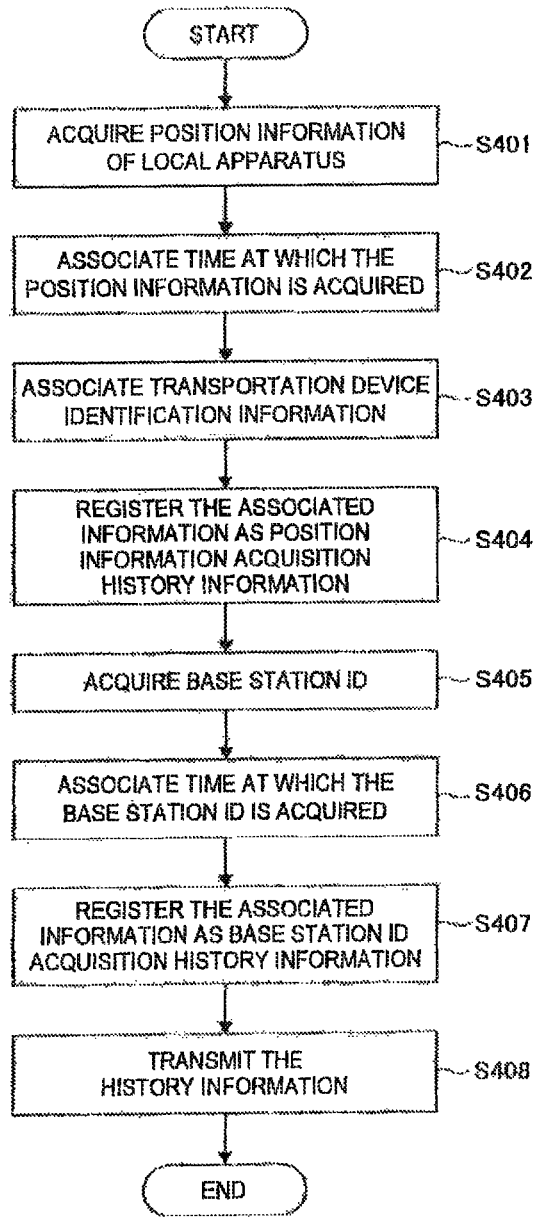
FIG. 13 is a flow chart (Part 1) showing the flow of transmission operation of the history information by the communication apparatus.

Subsequently, the transmission operation (Part 2) of history information by the communication apparatus 40 will be described with reference to FIG. 13. FIG. 13 is a flow chart (Part 2) showing the flow of transmission operation of history information by the communication apparatus 40.

Referring to FIG. 13, the positioning unit 421 of the communication apparatus 40 first acquires position information of the local apparatus (step S401). The history information registration unit 430 associates the time at which the position information is acquired by the positioning unit 421 with the position information (step S402), associates transportation device identification information acquired by the transportation device identification information acquisition unit 445 (step S403), and registers the associated information as position information acquisition history information with the history information registration unit 430 (step S404).

Subsequently, the base station detection unit 422 acquires a base station ID (step S405). The history information registration unit 430 associates the time at which the base station ID is acquired by the base station detection unit 422 with the base station ID (step S406) and registers the associated information as base station ID acquisition history information with the history information registration unit 430 (step S407). The transmission control unit 450 transmits history information containing the position information acquisition history information and base station ID acquisition history information to the information management apparatus 20 in predetermined timing (step S408) and terminates processing. The predetermined timing is as described above.

In the example shown in FIG. 13, one piece each of position information history information and base station ID acquisition history information is assumed to be included in history information for transmission for the sake of simplicity, but the present embodiment is not limited to this and a plurality of pieces of one or both of the position information history information and the base station ID acquisition history information may be included in the history information. The communication apparatus 40 is assumed to transmit position information history information and base station ID acquisition history information simultaneously by including the information in history information, but the position information history information and the base station ID acquisition history information may be transmitted separately. The communication apparatus 40 is also assumed to acquire base station ID acquisition history information after acquiring position information history information, but the order of acquisition is not specifically limited and the position information history information may be acquired after the base station ID acquisition history information being acquired. In addition, processing is to be terminated after step S408, but processing may return to step S401.

[15. Operation of Information Management Apparatus (Part 2)]

Figure 14:
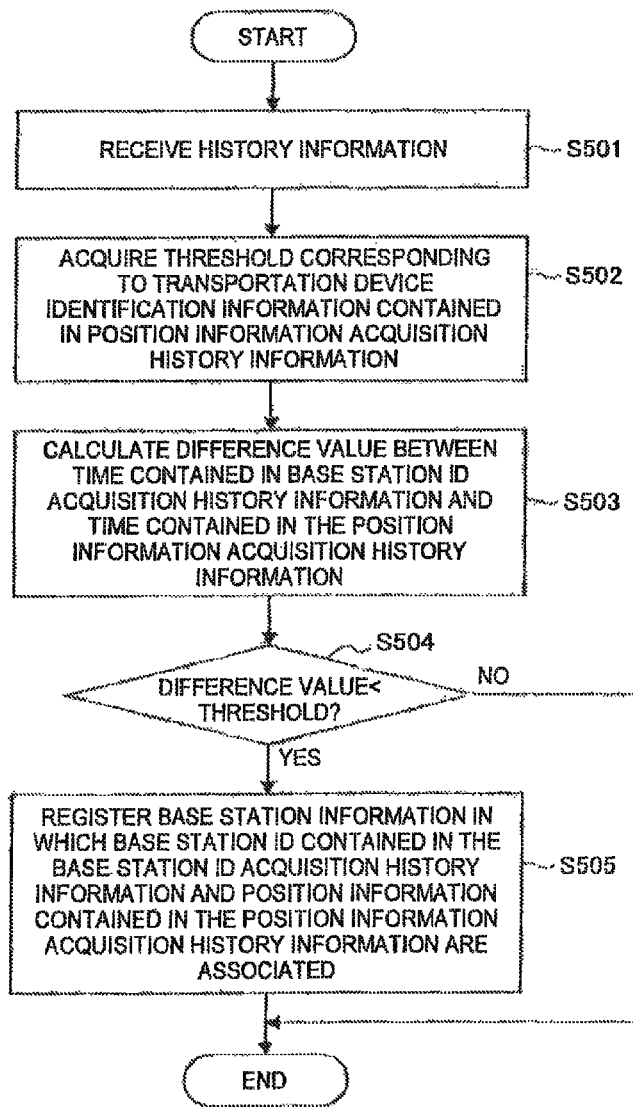
FIG. 14 is a flow chart (Part 1) showing the flow of update operation of the base station information by the information management apparatus.

Subsequently, the update operation (Part 2) of base station information by the information management apparatus 20 will be described with reference to FIG. 14. FIG. 14 is a flow chart (Part 2) showing the flow of update operation of base station information by the information management apparatus 20.

Referring to FIG. 14, the history information registration unit 260 first receives history information including position information history information and base station ID acquisition history information from the communication apparatus 40 via the communication unit 210 (step S501). The history information registration unit 260 stores the received history information in the storage unit 220. The registration determination unit 230 acquires the threshold corresponding to transportation device identification information contained in the received position information acquisition history information from transportation information stored in the storage unit 220 (step S502). The registration determination unit 230 calculates a difference value between the time contained in the position information history information and the time contained in the base station ID acquisition history information stored in the storage unit 220 (step S503). The registration determination unit 230 determines whether the calculated difference value is less than the threshold stored in the storage unit 220 (step S504). If the registration determination unit 230 determines that the difference value is not less than the threshold ("NO" in step S504), the registration determination unit 230 terminates processing. If the registration determination unit 230 determines that the difference value is less than the threshold ("YES" in step S504), the registration determination unit 230 registers base station information in which the base station ID contained in the base station ID acquisition history information and position information contained in the position information acquisition history information are associated with the storage unit 220 (step S505) and terminates processing.

In the example shown in FIG. 14, one piece each of position information history information and base station ID acquisition history information is assumed to be included in history information for the sake of simplicity, but the present embodiment is not limited to this and a plurality of pieces of one or both of the position information history information and the base station ID acquisition history information may be included in the history information. In this case, for example, processing similar to processing performed for each piece may be performed for all combinations of the position information history information and the base station ID acquisition history information. Position information history information and base station ID acquisition history information contained in history information are assumed to be received simultaneously, but the position information history information and the base station ID acquisition history information may be received separately. In addition, processing is to be terminated after step S505, but processing may return to step S501.

[16. Effects of the Present Embodiment]

According to the communication system 10 in the present embodiment of the present invention, as described above, position information indicating the installation position of a base station can automatically be reflected in base station information stored in the storage unit 220 of the information management apparatus 20. That is, time and effort needed for a user to set base station information to the information management apparatus 20 can be saved.

If time information is contained in each of position information acquisition history information and base station ID acquisition history information transmitted by the communication apparatus 40, as described above, the information management apparatus 20 can impose predetermined conditions on the time information contained in each piece of the history information. If, for example, the information management apparatus 20 determines that the time information contained in each piece of the history information satisfies the predetermined conditions, the information management apparatus 20 can associate position information contained in the position information acquisition history information and a base station ID contained in the base station ID acquisition history information and register the associated information with the storage unit 220 as base station information. According to this, accuracy of base station information registered with the information management apparatus 20 can be improved.

[17. Modification of the Present Embodiment]

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, when a signal (for example, a beacon signal) transmitted from the base station 30 is received, the communication apparatus 40 may measure signal strength of the signal to associate the measured signal strength with the base station ID of the base station 30 and terminates the associated information to the information management apparatus 20 as signal strength information. Accordingly, the information management apparatus 20 determines whether the received signal strength satisfies predetermined conditions. If the information management apparatus 20 determines that the received signal strength satisfies the predetermined conditions, the information management apparatus 20 can adopt the base station ID associated with the signal strength as base station information to be registered with the storage unit 220. Also in this case, for example, the storage unit 220 may be caused to store a threshold of signal strength so that the information management apparatus 20 may determine whether signal strength exceeds the threshold. Then, if the information management apparatus 20 determines that signal strength exceeds the threshold, the base station ID associated with the signal strength may be adopted as base station information to be registered with the storage unit 220. According to this, accuracy of base station information registered with the information management apparatus 20 can further be improved.

If, for example, base station information is already registered with the storage unit 220, the base station information registration unit 240 of the information management apparatus 20 may replace the registered base station information with newly acquired base station information. In this case, if, for example, base station information that is more accurate than the registered base station information can newly be acquired, the registered base station information may be replaced with the newly acquired base station information. If, for example, it is difficult to acquire base station information that is more accurate than the registered base station information, the registered base station information may not be replaced.

The present embodiment has been described by taking an example in which the information management apparatus 20 and the communication apparatus 40 are separately configured, but the present embodiment is not limited to such an example and the information management apparatus 20 and the communication apparatus 40 may integrally be configured. In this case, the information management apparatus 20 can update the storage unit 220 by receiving history information not only from the integrally configured communication apparatus 40, but also from other communication apparatuses.

Each step in processing of the communication system 10 herein need not necessarily be performed chronologically in the order described as a flow chart or a sequence diagram and may contain processing performed in parallel or individually (for example, parallel processing or processing by an object).

The invention claimed is:

1. An apparatus comprising:
   circuitry configured to acquire a position information;
   circuitry configured to associate first time information with the acquired position information;
   circuitry configured to acquire identification information of a base station; and
   circuitry configured to associate second time information with the acquired identification information,
   wherein, when a difference value between the first time information and the second time information is less than a predetermined value, the acquired position information and the identification information are registered in association with each other, and
   wherein the first time information indicates the time that the position information is acquired, and the second time information indicates the time that the identification information of the base station is acquired.

2. The apparatus of claim 1, further comprising:
   circuitry configured to initiate a transmission, to an external apparatus, of the acquired position information, the first time information, the identification information of the base station, and the second time information.

3. The apparatus of claim 2, further comprising:
   a non-transitory computer-readable storage medium,
   wherein the transmission is initiated when a predetermined amount of information has been stored within the non-transitory computer-readable medium.

4. The apparatus of claim 2, wherein the transmission is initiated when a predetermined time period elapses after a last transmission to the external apparatus.

5. A method comprising:
   acquiring a position information of an apparatus;
   associating first time information with the acquired position information;
   acquiring identification information of a base station;
   associating second time information with the acquired identification information; and
   registering, when a difference value between the first time information and the second time information is less than a predetermined value, the acquired position information and the identification information in association with each other,
   wherein the first time information indicates the time that the position information is acquired, and the second time information indicates the time that the identification information of the base station is acquired.

6. The method of claim 5, further comprising:
transmitting, to an external apparatus, the acquired position information, the first time information, the identification information of the base station, and the second time information.

7. The method of claim 6, wherein the transmission is initiated when a predetermined amount of information has been stored within a non-transitory computer-readable medium.

8. The apparatus of claim 6, wherein the transmission is initiated when a predetermined time period elapses after a last transmission to the external apparatus.

9. A non-transitory computer-readable medium having embodied thereon a program, which when executed by a computer causes the computer to execute a method, the method comprising:
acquiring a position information of an apparatus;
associating first time information with the acquired position information;
acquiring identification information of a base station;
associating second time information with the acquired identification information; and
registering, when a difference value between the first time information and the second time information is less than a predetermined value, the acquired position information and the identification information in association with each other,
wherein the first time information indicates the time that the position information is acquired, and the second time information indicates the time that the identification information of the base station is acquired.

10. The apparatus of claim 1, wherein a plurality of previously acquired position information are registered in association with a plurality of previously acquired identification information, as history information.

11. The method of claim 5, wherein a plurality of previously acquired position information are registered in association with a plurality of previously acquired identification information, as history information.

12. The non-transitory computer-readable medium of claim 9, wherein a plurality of previously acquired position information are registered in association with a plurality of previously acquired identification information, as history information.

* * * * *